United States Patent
Lee et al.

(10) Patent No.: US 7,287,771 B2
(45) Date of Patent: Oct. 30, 2007

(54) POWERED RUNNING BOARD WITH LINEAR DRIVE

(75) Inventors: V-Bond Lee, Mississauga (CA); Anthony Wolf, Thornhill (CA); Zygmunt Piotrowski, Woodbridge (CA)

(73) Assignee: Magna International Inc., Aurora, Ontario (CA)

( * ) Notice: Subject to any disclaimer, the term of this patent is extended or adjusted under 35 U.S.C. 154(b) by 171 days.

(21) Appl. No.: 10/971,588

(22) Filed: Oct. 22, 2004

(65) Prior Publication Data
US 2005/0104318 A1    May 19, 2005

(51) Int. Cl.
*B60R 3/00* (2006.01)

(52) U.S. Cl. ............... 280/166; 280/163; 280/164.1

(58) Field of Classification Search ............. 280/166, 280/163, 164.1
See application file for complete search history.

(56) References Cited

U.S. PATENT DOCUMENTS

| | | | |
|---|---|---|---|
| 3,762,742 A | | 10/1973 | Bucklen |
| 4,073,502 A | * | 2/1978 | Frank et al. ............ 280/166 |
| 4,110,673 A | | 8/1978 | Nagy et al. |
| 4,116,457 A | | 9/1978 | Nerem et al. |
| 4,982,974 A | * | 1/1991 | Guidry .................. 280/164.2 |
| 5,111,912 A | * | 5/1992 | Kempf .................... 187/250 |
| 5,842,709 A | | 12/1998 | Maccabee |
| 5,957,237 A | * | 9/1999 | Tigner .................... 182/127 |
| 6,149,172 A | | 11/2000 | Pascoe et al. |
| 6,325,397 B1 | | 12/2001 | Pascoe et al. |
| 6,375,207 B1 | | 4/2002 | Dean et al. |
| 6,641,158 B2 | | 11/2003 | Leitner |
| 2002/0113400 A1 | | 8/2002 | Leitner |
| 2003/0132595 A1 | * | 7/2003 | Fabiano et al. ............ 280/166 |
| 2003/0184040 A1 | | 10/2003 | Leitner et al. |

* cited by examiner

*Primary Examiner*—Christopher P. Ellis
*Assistant Examiner*—John R. Olszewski
(74) *Attorney, Agent, or Firm*—Clark Hill PLC

(57) ABSTRACT

A powered running board assembly has a deck and at least two hinges extending from the deck for mounting longitudinally the deck to an underside of a vehicle. Each hinge has a mounting bracket configured to mount to the underside of the vehicle. A pair of links pivotally extending between the deck and mounting bracket. The deck is movable between a retracted position and an extended position. A linear drive assembly operably engages at least one of the hinges to drive the deck between the retracted and extended positions. The linear drive assembly operably extends between opposite pivots of the pair of links. As the drive extends and retracts, the pair of links is expanded and contracted effecting the desired movement of the running board between inboard and outboard positions.

12 Claims, 6 Drawing Sheets

POWERED RUNNING BOARD WITH LINEAR DRIVE

FIELD OF INVENTION

This invention relates to certain improvements to a powered running board.

BACKGROUND OF THE INVENTION

Running boards are available as an option for larger sized vehicles such as sport utility vehicles, pick-up trucks, mini-vans, and cross-ever vehicles. In model year 2003, the Lincoln Navigator became the first vehicle available with a factory installed powered running board. In this running board, the deck or stepping platform will automatically retract and extend upon closing and opening the door. This retractable running board is described in United States Patent Publication no. US 2002/0113400 ('400).

The '400 running board provides a deck that extends longitudinally along the side of the vehicle adjacent the rocker panel. The deck is operably connected to the vehicle by a set of four bar links. A drive motor is operably connected to a gear box to effect drive to the four bar link to move the running board between inboard and outboard positions. The gear box adds considerable cost to the running board assembly, and its size increases weight and reduces the applicability of the drive mechanism for small vehicles with limited packaging space under the vehicle.

In U.S. Pat. No. 6,375,207, a retractable running board is illustrated. The running board assembly has a deck supported by a series of hinges. Each hinge is a four bar link. An axle gangs each of the hinges together such that a single drive can be applied to the axle to drive uniformly each of the hinges.

SUMMARY OF INVENTION

The disadvantages of the prior art may be overcome by providing a powered running board with a linear drive that operably engages a pivot of the four bar link to effect the inboard and outboard movement.

It is desirable to provide a linear drive operable between two opposite pivots of the four bar link to effect inboard and outboard movement.

It is desirable to provide a linear drive operable between a base and one of the moving pivots of the four bar link to effect inboard and outboard movement.

According to one aspect of the invention, there is provided a powered running board assembly. The powered running board assembly has a longitudinally extending deck and at least two hinges extending from the deck for mounting the deck to an underside of a vehicle. Each hinge has a mounting bracket configured to mount to the underside of the vehicle. A pair of links pivotally extending between the deck and mounting bracket. The deck is movable between a retracted inboard position and an extended outboard position. A linear drive assembly operably extends between opposite pivots of the four bar link. As the drive extends and retracts, the four bar link is expanded and contracted effecting the desired movement of the running board between inboard and outboard positions.

According to another aspect of the invention, the linear drive assembly extends between the mounting bracket and one of the lower pivots of the four bar link. As the drive extends and retracts, the four bar link is expanded and contracted effecting the desired movement of the running board between inboard and outboard positions.

According to another aspect of the invention, the linear drive assembly is a worm gear drive.

DESCRIPTION OF THE DRAWINGS

In Figures that illustrate embodiments of the present invention.

DESCRIPTION OF THE INVENTION

Figure 1:
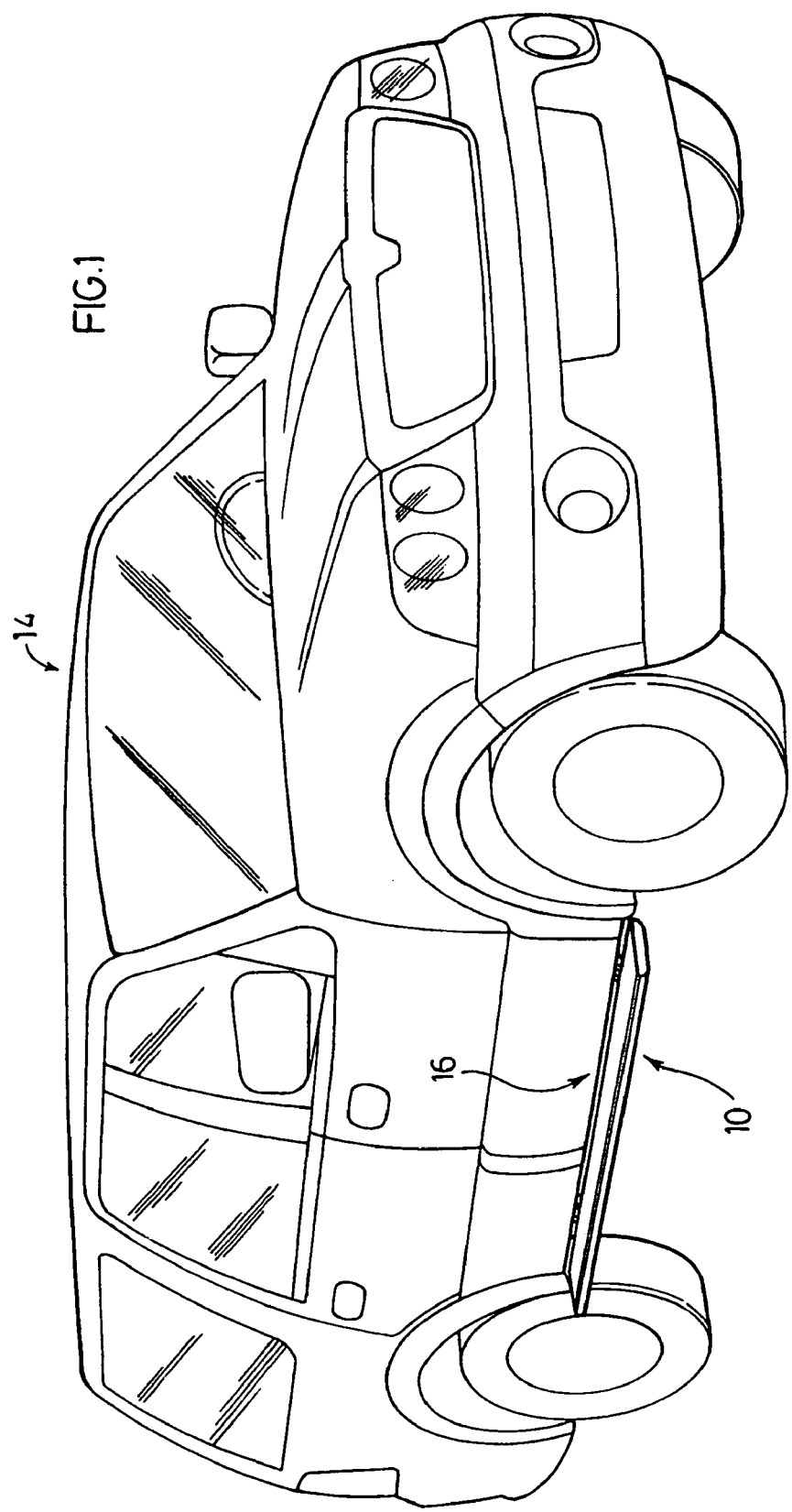
FIG. 1 is a perspective view of a vehicle incorporating the preferred embodiment of the present invention.

The powered running board 10 of the present invention is generally illustrated in FIG. 1. The running board 10 is mounted to the underside of the vehicle 14 along the rocker panel 16. The running board 10 extends in a generally longitudinal direction relative to the vehicle 14.

Figure 2:
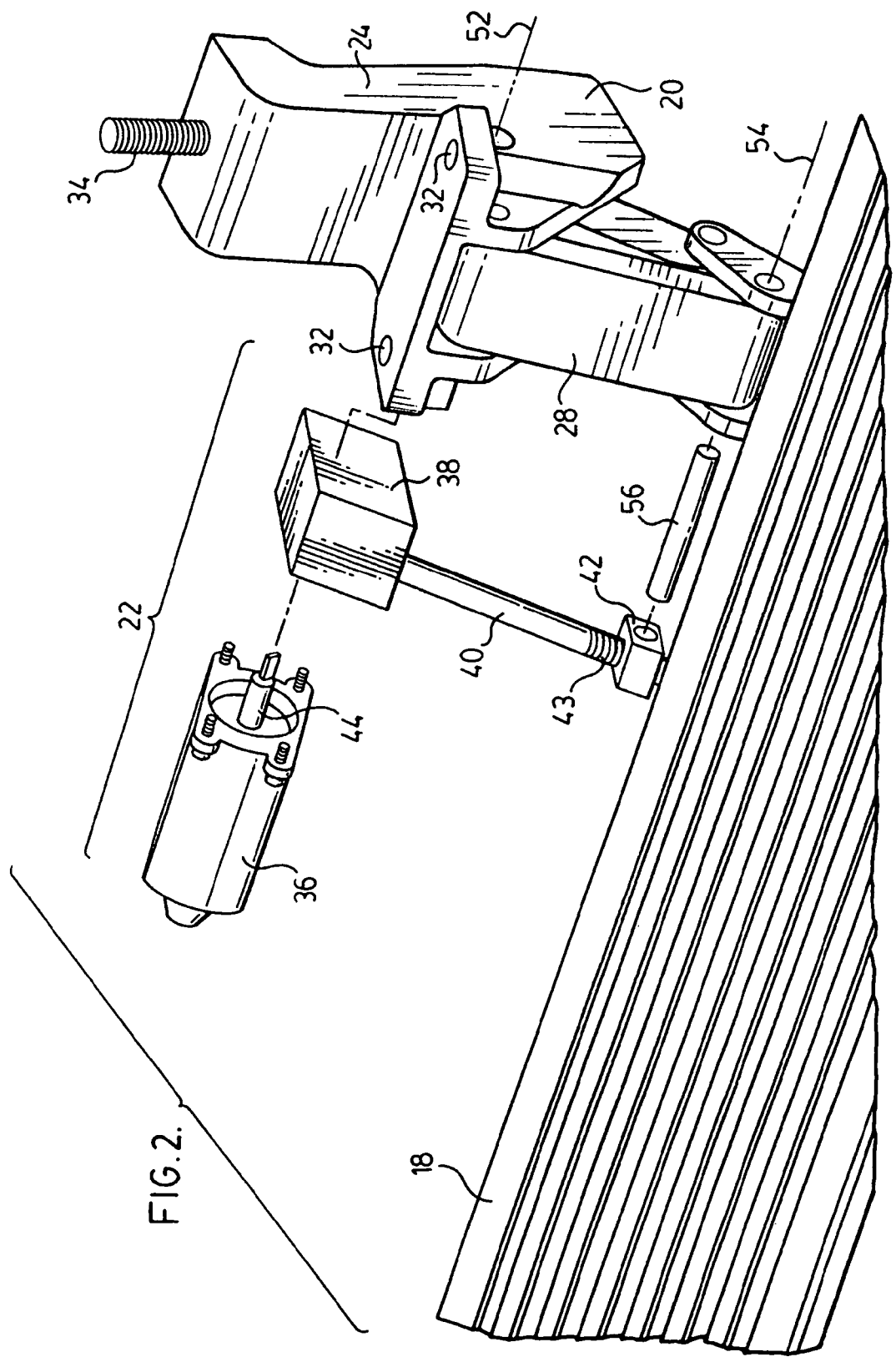
FIG. 2 is a partial perspective view of the embodiment of FIG. 1, with a drive assembly in exploded view.

Referring to FIG. 2, the running board 10 is illustrated in greater detail. The running board 10 comprises a deck 18, a pair of support hinges 20 and a linear drive assembly 22. Linear drive assembly 22 operably engages at least one of the support hinges 20 to move the deck 18 between a retracted inboard or stored condition and an extended outboard or deployed condition.

Figure 3:
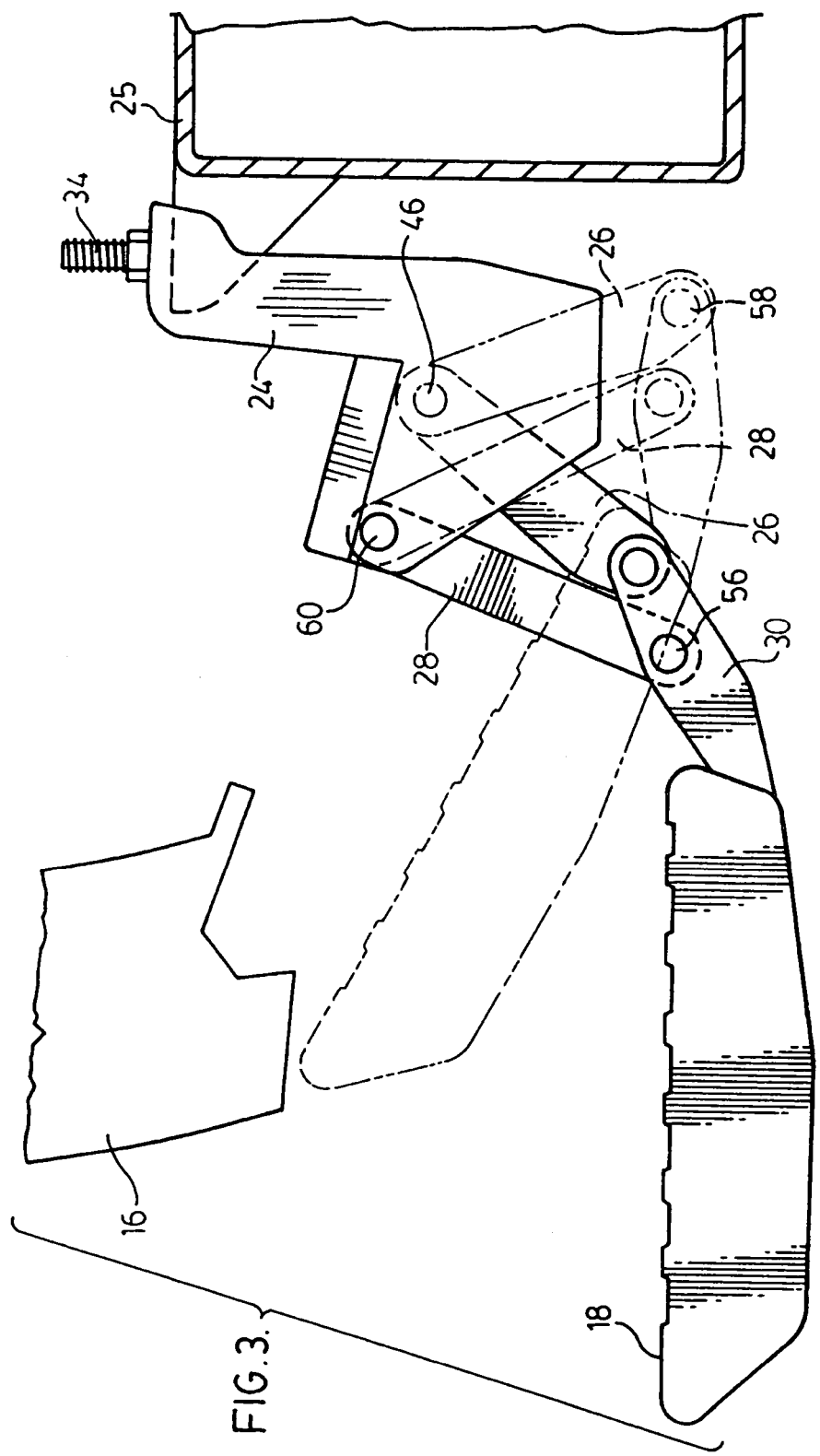
FIG. 3 is an end elevation view of the embodiment of FIG. 1.

Referring to FIGS. 2 and 3, each hinge 20 comprises an L-shaped bracket 24, a pair of links 26, 28 and a bracket 30. The L-shaped bracket 24 is configured to the shape of the frame section or vehicle chassis 25 to which the running board 10 is to be attached. The configuration will thus change depending on the particular vehicle application. The L-shaped bracket 24 has a plurality of apertures 32, through which, mounting bolts 34 extend to mount the bracket 24 to the vehicle frame 25.

The links 26 and 28 are pivotally mounted to the bracket 24 and bracket 30. Links 26 and 28 are of unequal length and define a four bar link arrangement. The pivot points between the links 26, 28 on bracket 24 are spaced at a greater distance than pivots points on bracket 30. The particular arrangement provides the desired movement of the deck 18 between the retracted inboard (dashed lines) and extended outboard positions (solid lines).

Referring to FIG. 2, the linear drive assembly 22 is illustrated in exploded view. The linear drive assembly 22 comprises a motor 36; a gear box 38, a threaded lead screw 40 and a threaded nut or dog 42. Nut 42 is threadingly mounted on threaded portion 43 of lead screw 40 such that rotation of the screw 40 drives the nut 42 therealong.

The motor 36 has an armature 44. The end of the motor 36 is configured to mount onto the gear box 38. Gear box 38 mounts on the L-shaped bracket 24 to support the motor 36. Motor 36 mounts in a substantially longitudinal direction or generally parallel to the longitudinal extent of the deck 18. However, as will be apparent, the motor 36 may also mount in other orientations, depending upon space availability under the particular vehicle being fitted.

Figure 4:
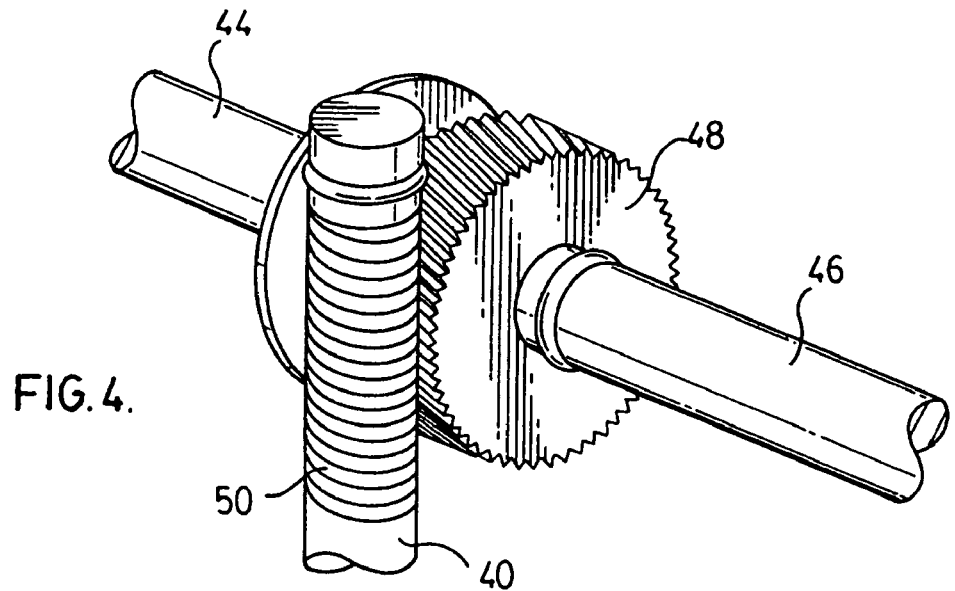
FIG. 4 is a partial perspective view of the drive assembly.

The gear box 38 encloses the end of the motor armature 44 which has a gear 48 fixedly mounted to the end, as shown in FIG. 4. This gear 48 mates perpendicularly with a worm gear 50 which is fixedly mounted on the end of the lead screw 40, opposite the threaded portion 43. Gears 48 and 50 are mounted within gear box 38.

The lead screw 40 actuates linearly, extending and retracting the dog 42, to vary the distance between two opposite pivot points in the four bar linkage. A shaft 46 extends parallel to the motor armature 44, through bracket 24 to pivotally mount link 26. Link 26 defines axis of rotation 52. Axle 56 is pivotally connected to the dog 42 and extends through bracket 30 and link 28, defining axis of rotation 54. Axis 54 and axis 52 are opposite pivots of the four bar link as are the axes defined by rods 58 and 60, that pivotally mount opposite ends of the links 26, 28 between brackets 24 and 30. Additionally, the distal ends of links 26, 28, pivot pins 56, 58, move arcuately relative to the pivot pins 46, 60.

Preferably, armature 44 of motor 36 is co-extensive with shaft 46. In another embodiment, the armature 44 and shaft 46 are common.

In operation, rotation of the motor 36 in a first sense will rotate the lead screw 40 and drive the nut or dog 42 therealong. The distance separating the axis 52 and axis 54 is expanded. The linear driving force expanding the link separation will move the running board 10 from the retracted position to the extended position. Rotating the motor 36 in the opposite sense will decrease the separation between the axis 52 and axis 54. The linear driving force contracting the link separation will move the running board 10 from the extended position to the retracted position.

The present invention has been described in terms of a drive assembly having a motor drivingly rotating a lead screw. It is now apparent to those skilled in the art that drive assembly could include other convention linear actuators such as pneumatic or hydraulic cylinders, solenoids and linear actuators that are commonly utilized in the automotive industry. In particular, linear actuators could include actuators that are incorporated into door latches for effecting powered functions in a door, such as locking and unlocking, powered release and powered cinching.

Figure 5:
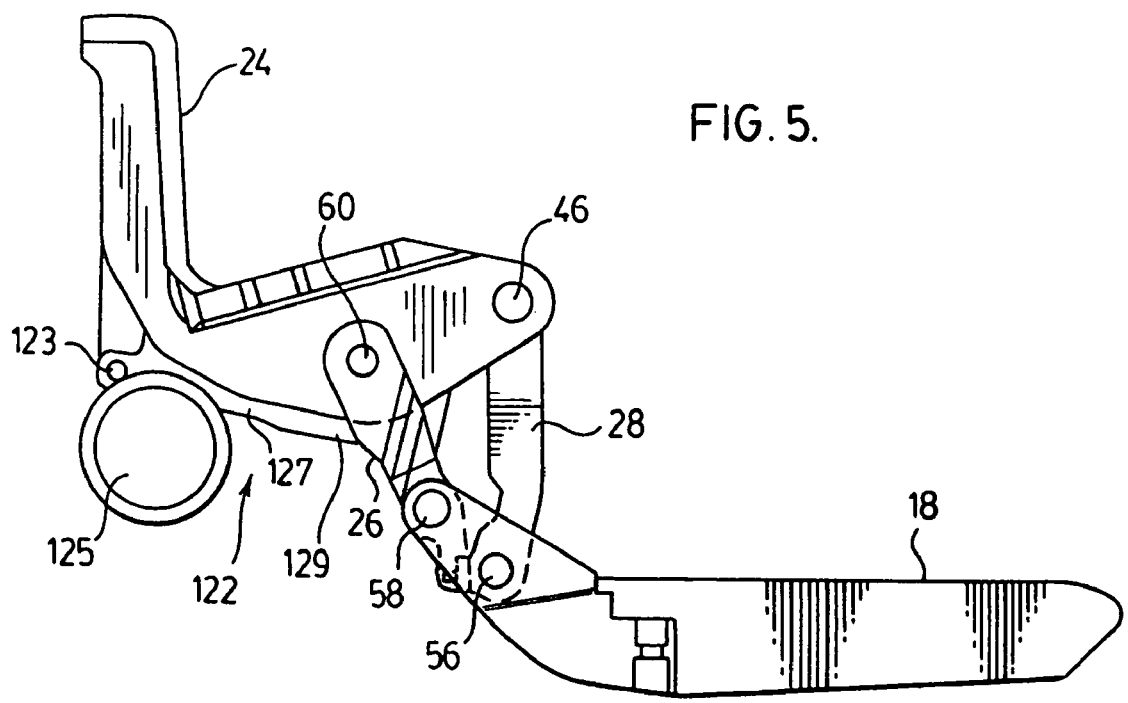
FIG. 5 is an end elevation view of a second embodiment of the present invention.

Referring to FIG. 5, a second embodiment of the present invention is illustrated. The second embodiment is identical to the first embodiment except the mounting points of the linear drive assembly 122. The linear drive assembly is pivotally connected to the bracket 24 at a lower inboard location by pin 123. The opposite end of the drive assembly 122 is pivotally mounted to one of the lower pivots of the four bar link. In the illustrated embodiment drive assembly is pivotally connected to pin 58. Motor 125 extends longitudinally, generally parallel to the longitudinal extent of the deck 18. The motor 125 rotates a worm gear 127 that is threadingly engaged with a dog 129. Dog 129 is pivotally connected to pin 58.

Figure 6:
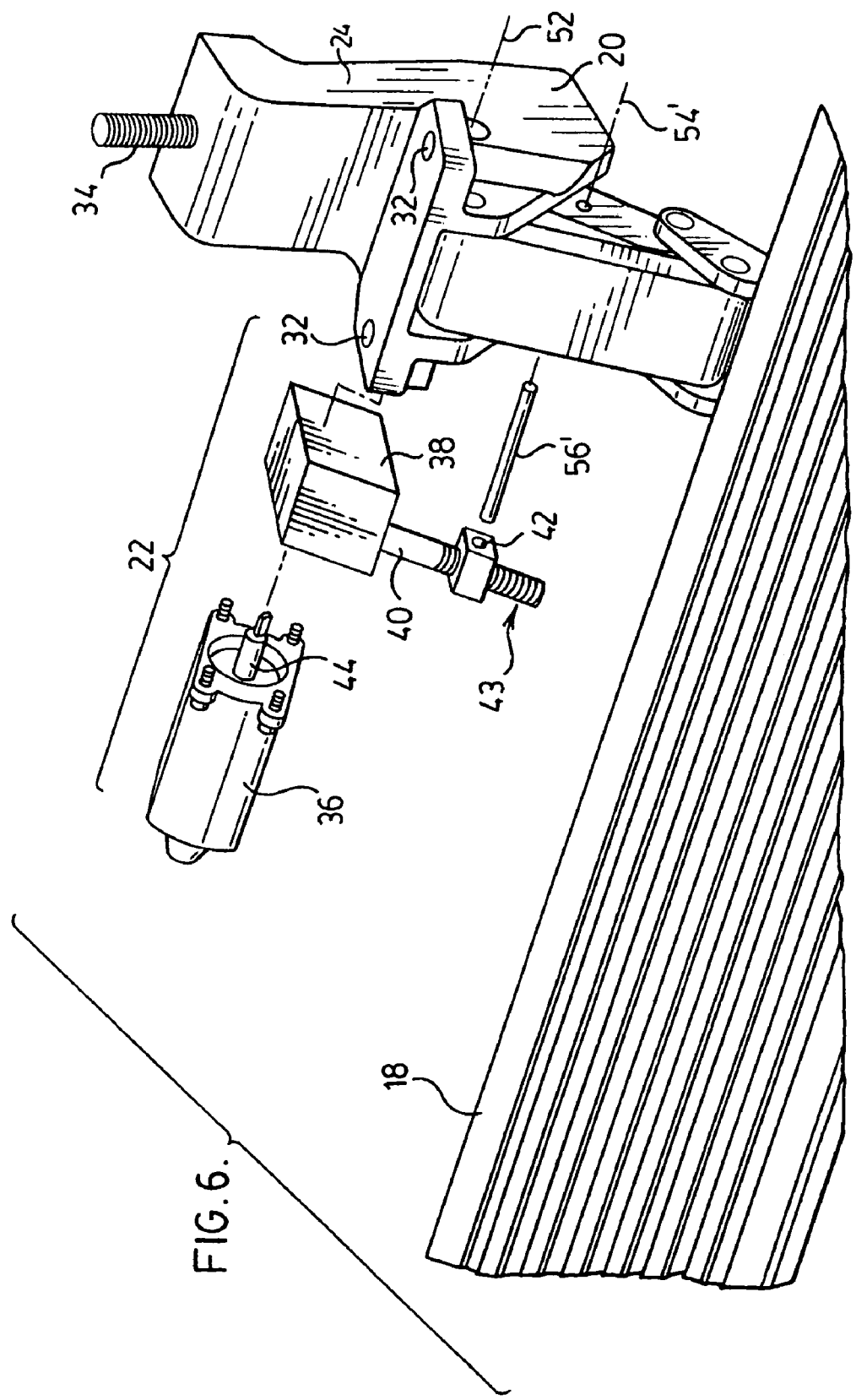
FIG. 6 is a partial perspective view of a third embodiment of the present invention.
Figure 7:
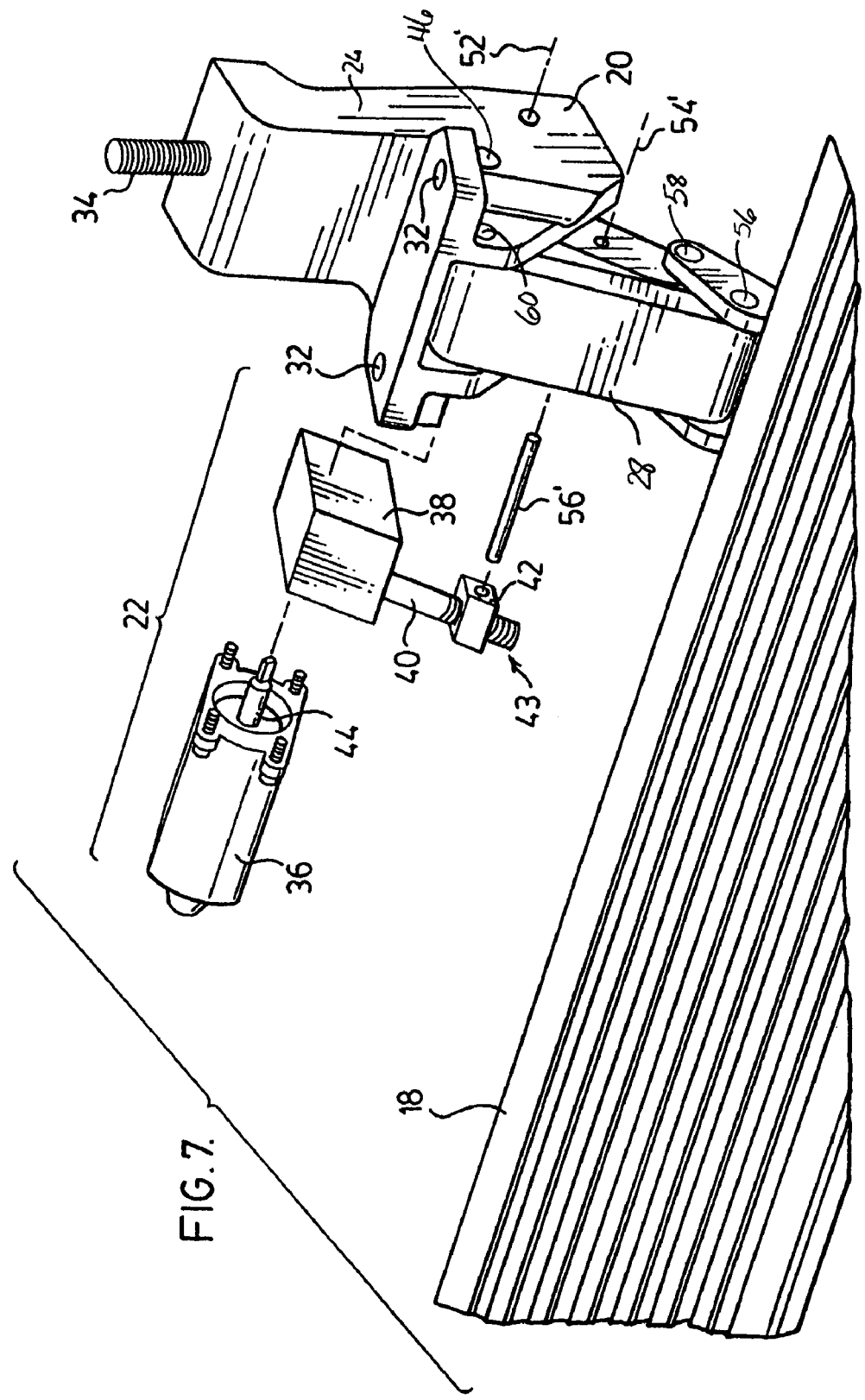
FIG. 7 is a partial perspective view of a fourth embodiment of the present invention.

It is now apparent to those skilled in the art that the drive assembly 22 operably engages at least one of the links 26, 28 to effect the movement of the running board 10. In the most preferred example, the linear drive assembly 22 is. mounted between the mounting bracket 24 and link 28 at the moving pivot pin 56. In other contemplated embodiments, the nut 42 could be pivotally mounted to one of the links 26, 28 at a point intermediate the pivots at pivot pins 46, 58 or 56, 60 (FIG. 6). In the embodiment shown in FIG. 6, the nut 42 is pivotally connected to axle 56' defining axis of rotation 54'. Additionally, the linear drive assembly 22 could be mounted on the mounting bracket 24 at a point other than the armature 44 aligning with axle 46 (FIG. 7). In the embodiment shown in FIG. 7, the armature 44 extends through bracket 24 defining axis of rotation 52'. These arrangements are less desirable because of the reduced mechanical advantage and increased costs.

The invention has been described in an illustrative manner, and it is to be understood that the terminology which has been used is intended to be in the nature of words of description rather than of limitation. Many modifications and variations of the present invention are possible in light of the above teachings. It is, therefore, to be understood that the invention may be practiced otherwise than as specifically described.

What is claimed is:

1. A powered running board assembly comprising:
   a deck;
   a hinge extending from the deck for mounting the deck to an underside of a vehicle, the hinge comprising a mounting bracket configured to mount to said underside, and a pair of links pivotally extending between said deck and said mounting bracket, said deck movable between a retracted inboard position and an extended outboard position, and
   a linear drive assembly operably engaging said hinge to drive said deck movement, said linear drive assembly extending between a first end pivotally connected to said mounting bracket and a second end pivotally connected to one of said pair of links, whereby actuating said linear drive assembly extends and retracts said second end linearly, thereby expanding and contracting said pair of links and effecting movement of the deck between said inboard and outboard positions.

2. A powered running board assembly as set forth in claim 1, wherein said linear drive assembly comprises a drive motor, a gear box operably engaging the drive motor, a threaded screw bi-directionally driven by said drive motor through said gear box and a dog threadingly engaged on said threaded screw.

3. A powered running board assembly as set forth in claim 2, wherein said gear box is mounted on said mounting bracket of said at least one hinge and said gear box supports said drive motor.

4. A powered running board assembly as set forth in claim 3, wherein dog is mounted on one of said pairs of links of said at least one of said hinges.

5. A powered running board assembly as set forth in claim 4, wherein said drive motor has a rotational axis that extends generally parallel to a longitudinal extent of said deck.

6. A powered running board assembly as set forth in claim 1, wherein said second end of said linear drive assembly is pivotally connected to a lower pivot point between one of said pair of links and said deck.

7. A powered running board assembly as set forth in claim 6, wherein said lower pivot point moves relative to said mounting bracket.

8. A powered running board assembly as set forth in claim 7, wherein said linear drive assembly comprises a drive motor, a gear box operably engaging the drive motor, a threaded screw bi-directionally driven by said drive motor through said gear box and a dog threadingly engaged on said threaded screw.

9. A powered running board assembly as set forth in claim 8, wherein said gear box is mounted on said mounting bracket of said hinge and said gear box supports said drive motor.

10. A powered running board assembly as set forth in claim 9, wherein said gear box is pivotally connected to said mounting bracket and said dog is pivotally connected to said lower pivot point.

11. A powered running board assembly as set forth in claim 9, wherein dog is mounted on a pivot pin between said pairs of links of said at least one of said hinges.

12. A powered running board assembly as set forth in claim 11, wherein said drive motor has a rotational axis that extends generally parallel to a longitudinal extent of said deck.

* * * * *